United States Patent [19]

Carey

[11] Patent Number: 5,370,893

[45] Date of Patent: Dec. 6, 1994

[54] PROCESS FOR PREPARING A POWDERED ICE CREAM

[75] Inventor: Dermot T. Carey, Haslett, Mich.

[73] Assignee: Michigan Milk Producers Association, Novi, Mich.

[21] Appl. No.: 68,148

[22] Filed: May 28, 1993

[51] Int. Cl.$^5$ ............................................. A23G 9/02
[52] U.S. Cl. .................... 426/565; 426/588; 426/443; 426/471
[58] Field of Search ............... 426/565, 566, 567, 588, 426/443, 471

[56] References Cited

U.S. PATENT DOCUMENTS

| | | | |
|---|---|---|---|
| 1,266,201 | 5/1918 | Boddington | 426/565 |
| 2,433,276 | 12/1947 | Hipple et al. | 426/565 |
| 3,810,765 | 5/1974 | Nagasawa et al. | 426/92 |
| 3,956,521 | 5/1986 | Pisecky et al. | 426/588 |
| 4,096,287 | 6/1978 | Kemp | 426/588 |
| 4,318,932 | 6/1978 | Ewing et al. | 426/285 |
| 4,338,347 | 7/1982 | Trop | 426/565 |
| 4,497,841 | 2/1985 | Wudel | 426/565 |
| 4,587,130 | 5/1986 | Stauber | 426/565 |

*Primary Examiner*—Jeanette Hunter
*Attorney, Agent, or Firm*—Knechtel, Demeur & Samlan

[57] ABSTRACT

A process for the preparation of a powdered ice cream product having both a high-fat and high-sugar content. The process comprises the steps of mixing cream, non-fat milk solids, sugar and a stabilizer and emulsifier with water to form a liquid homogeneous mixture. The mixture is then pasteurized and homogenized. It is then cooled to allow the stabilizer to fully activate. The mixture is then heated and atomized in a spray-drying chamber to form the powdered ice cream product. By accurately monitoring the proportion of the ingredients, temperatures and pressures throughout the process, a powdered ice cream product having a low moisture content is produced. The powdered ice cream is reconstituted by mixing the powder with water. It can then be frozen in a conventional ice cream maker resulting in a superior tasting product.

17 Claims, 1 Drawing Sheet

PROCESS FOR PREPARING A POWDERED ICE CREAM

BACKGROUND AND SUMMARY OF THE INVENTION

The present invention relates to a process for preparing a powdered ice cream product which can be re-constituted in cold water. The powdered ice cream product is high in fat and high in sugar.

Instant or dry powdered milk products have been widely manufactured and sold throughout the world. Some of these are fat-containing dry milk products and other are skim milk products. They may be unflavored or flavored such as instant hot or cold chocolate powdered mixes.

One example of an instant fat-containing dry milk is illustrated in U.S. Pat. No. 4,318,932. This patent discloses a process for manufacturing an instant dry milk in which non-fat milk powder is used as a source material and fat is added in the instantizing or agglomerating operation. The process addresses the problem of having an instant milk which is easily re-constituted and has good disbursability in cold water while not suffering from the problem of cream separation. However, this process does not address the problems of a powdered ice cream which requires not only a high fat content but a high sugar content.

U.S. Pat. No. 3,956,521 discloses a process for producing powder from milk using a spray-dried process to produce a powder which is further dried in a fluidized bed. The second drying process is required in order to produce the low humidity, low moisture content powder which is required in such applications.

The preparation of a powdered skim milk additive is disclosed in U.S. Pat. No. 4,096,287 in which an additive is prepared which when added to skim milk makes the resultant mixture taste and look more like whole milk.

As can be seen by reading the prior patents, the problems inherent in producing a powdered ice cream with good water solubility have not been addressed. Most of the prior art has dealt with the problems inherent in manufacturing a powdered skim milk or powdered whole milk product. However, when manufacturing a powdered ice cream product, different problems arise. For example, one must deal with not only the high fat content of the powder but also the high sugar content of the powder. Also, the finished powder must have a very low moisture content in the range of 1.2%–1.5% to facilitate good flow properties of the powder. The powder must re-constitute easily and completely and the individual components cannot separate.

Thus, it is an object to provide a powdered ice cream product that can be stored and shipped without the need for refrigerated containers or transport means.

It is another object of the invention to provide a process for the preparation of a powdered ice cream product having a high fat and high sugar content yet retain good flavor and physical appearance characteristics. A related object is the object of providing a process for the preparation of a powdered ice cream product which is low in its final moisture content which prevents the powder from melting and sticking to itself or the containers in which the powder is manufactured and transported.

Another object is to provide a powdered ice cream product which can be easily and completely re-constituted with water. Yet another object is the object of providing a process which provides a homogenous powdered ice cream in which the sugars, milk solids or fats do not separate when re-constituted. Related to this object is the object of providing a homogenous powdered ice cream in which the components are homogeneously distributed throughout the powder in their correct percentages.

Another object is the object of providing a process for the preparation of a powdered ice cream product which is relatively economical in its manufacture and provides for a single stage, spray-drying process to manufacture the powder.

The inventive process comprises first preparing a liquid ice cream mix by mixing milk solids, cream, sugar and a stabilizer/emulsifier. Flavoring may be added at this step. The mix at this point contains approximately 40.5% total solids consisting of approximately 15% fat, 16% sugar, 9% milk solids—non-fat and ½% stabilizer/emulsifier.

The mixture is then pasteurized at approximately 180° F. for 22.5 seconds via the high temperature short time process. It is then homogenized at approximately 2800 psi. The mixture is then immediately cooled to 40°–42° F. and held at this temperature for 3–4 hours. The mixture is then pre-heated to approximately 160° F. and pumped to a single-stage spray-drying chamber by means of a high pressure pump at approximately 2500 psi. The mixture is atomized through a series of rotating head pressure nozzles. As the atomized mixture enters the drying chamber, it is formed into powder particles through contact with the hot air. The moisture content is maintained at 1.2%–1.5%. In order to re-constitute the powder, it is only necessary to mix it with the proper amount of water to re-constitute a mixture identical to that which was spray-dried. The mixture is then frozen in an ice cream maker with the resultant ice cream having improved flavor and physical appearance characteristics as compared to powdered ice cream formed by other processes.

These and other objects and advantages of the invention will become apparent upon reading the detailed description of the preferred embodiment.

DESCRIPTION OF THE PREFERRED EMBODIMENT

Figure 1:
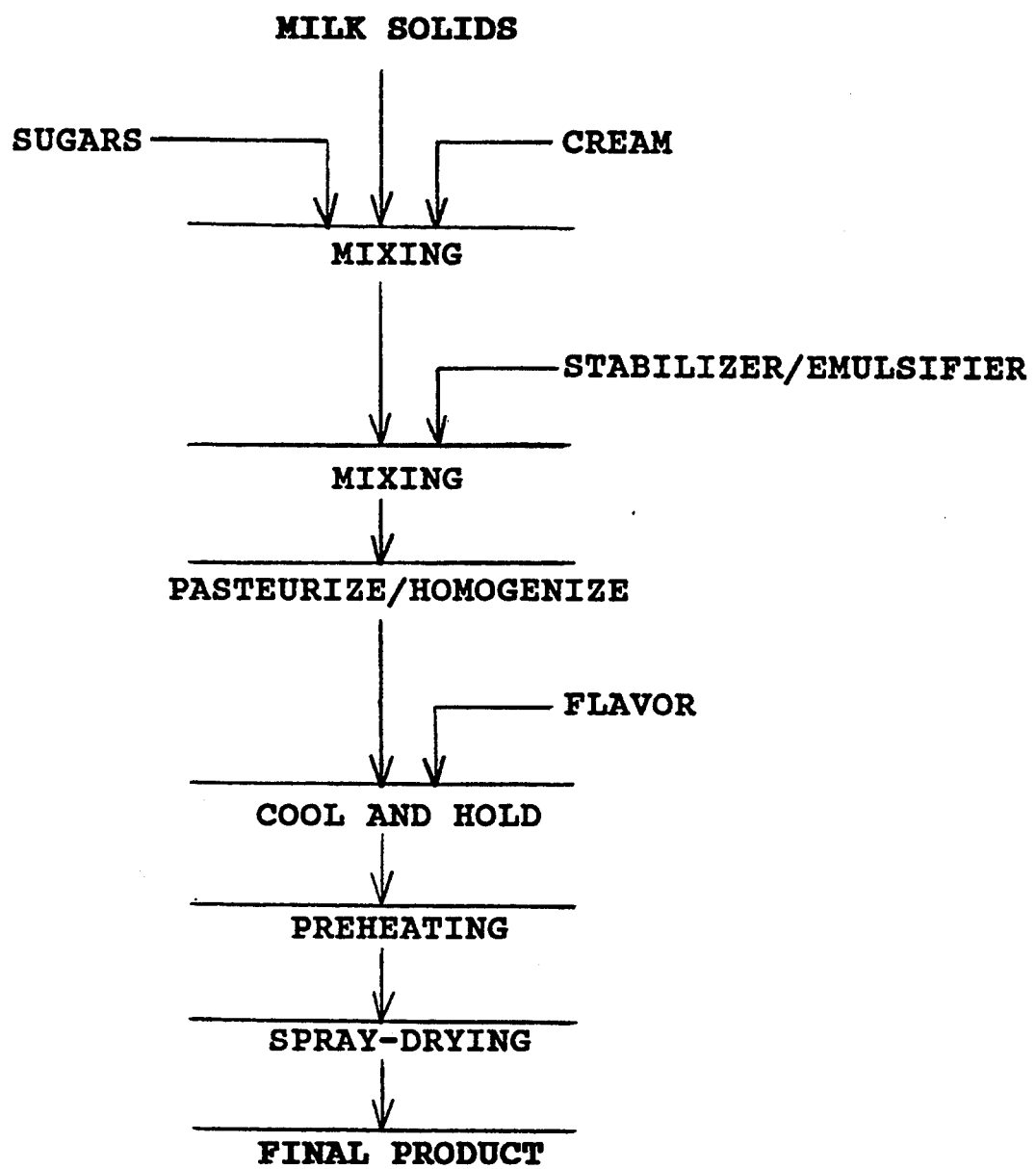
FIG. 1 is a flow chart illustrating the inventive process for producing a powdered ice cream.

The process for producing a powdered ice cream product is illustrated in FIG. 1 which is the process schematic. First, in step 1, the sugars, milk solids and cream are mixed with water in a standard mixing process. The components are mixed in the following ratio: 16% sugar, 15% fat, and 9% milk solids—non-fat. The fat is preferably added as cream and the milk solids added as condensed skim milk. A mixture feed flow rate of 10,000 lbs. per hour was accomplished using the following quantities of raw components: 1600 lbs. of sugar, 3,750 lbs. of cream, 3,000 lbs. of condensed skim milk and 1,570 lbs. of water. The mixture, at this point, contains 40% total solids. The sugar can be either refined sugar or other sweeteners such as corn syrup solids, high fructose corn syrup, etc. Throughout the application, the reference to sugar is intended to include all such other sweeteners. In step 2, a stabilizer/emulsifier such as guar gum carrageenan and polysorbate 80, which is a standardly available stabilizer/emulsifier, is added and thoroughly mixed into the mixture. The stabilizer/emulsifier is added in a ratio to provide for 0.3% of the stabilizer/emulsifier in the mixture. This is about 30 lbs. of the stabilizer/emulsifier added to the 10,000 lb. mixture.

In step 3, the homogeneous mixture is pasteurized at 170°–183° F. for 15–23 seconds via the high temperature short time (HTST) process and then homogenized at 2300psi–2800psi. The preferred embodiment is to pasteurize at 180° F. for 22.5 seconds and homogenize at 2800 psi. The mixture is then immediately cooled in step 4 to 40°–42° F. A flavor can be added in step 4 during the cooling process by thoroughly mixing the flavoring into the mixture. The cooled mixture is held at this temperature for 3–4 hours to allow the stabilizer to fully activate.

In step 5, the homogeneous mixture is then preheated in a tubular heater to between 158° F.–162° F. 160° F. was found to be the best temperature to preheat the mixture before pumping it to the spray-drying chamber. If the temperature of the mixture is too high, the sugars may melt. If it is too low, one does not get the viscosity required to atomize the mixture.

In step 6, the mixture is pumped at 2500 psi to a spray-drying chamber via a high-pressure pump. A box dryer (box chamber) was used in the spray-drying process. As the mixture enters the spray-dryer, it is atomized and formed into powder particles through contact with the hot air in the box dryer. An inlet temperature of 277° F. plus or minus 3° F. was found to be optimum. The air outlet temperature is maintained at 177° F. plus or minus 3° F.

The moisture content of the powdered ice cream is maintained at 1.2–1.5%. This facilitates good flow properties of the high fat, high sugar content powder. This also prevents the melting and sticking of the powder inside the drying chamber and in the powder transport system. The low moisture content is achieved by accurately controlling the inlet and outlet air temperatures in the box chamber.

In order to re-constitute the powder, one can add one pound of powder to 2¼ cups water. By stirring it with a whisk or a blender, one can re-constitute the powder to the original mixture. There is no separation of sugar, milk solids, fat, stabilizer or emulsifier. Each particle of the powder is homogeneous in its makeup with the result that the re-constituted mixture will be in the same proportion as the original ingredients. Additional flavorings can also be added to the mixture at this point to produce various flavors of ice cream. The mixture is then placed in a conventional ice cream maker and frozen. This results in an ice cream having the same taste and texture of ice cream produced directly from a mixture rather than from a powdered ice cream product.

Thus, there has been provided a process for the manufacture of a powdered ice cream product that fully satisfies the objects, aims and advantages set forth herein. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A process for the preparation of a powdered ice cream product having a high fat and high sugar content comprising the steps of:
   mixing cream, non-fat milk solids, sugar, stabilizer and emulsifier in a ratio by weight of approximately 8–18% butterfat, 15% non-fat milk solids, 12% sugar 0.3–1% stabilizer to form a liquid homogenous mixture;
   pasteurizing and homogenizing the mixture;
   cooling the mixture to approximately 33°–50° F. for 2–5 hours to allow the stabilizer to fully activate;
   heating the mixture to approximately 150°–160° F.; and
   atomizing the mixture in a drying chamber having an air inlet temperature of approximately 272°–282° F. and an air outlet temperature of approximately 172°–182° F. to form the powdered ice cream product.

2. The process of claim 1 wherein after pasteurizing and homogenizing the mixture, it is cooled to approximately 40°–42° F. for 3–4 hours to allow the stabilizer to fully activate.

3. The process of claim 1 wherein after the mixture is cooled to allow the stabilizer to fully activate, the mixture is heated to approximately 158°–162° F.

4. The process of claim 1 wherein the atomizing of the mixture takes place in a drying chamber having an air inlet temperature of approximately 274°–280° F. and an outlet temperature of approximately 174°–180° F.

5. The process of claim 1 and further comprising the step of adding a flavoring to the mixture after the step of pasteurizing and homogenizing.

6. The process of claim 4 wherein the atomizing of the mixture occurs at between 2400 psi and 3000 psi.

7. The process of claim 1 wherein the powdered ice cream product has a moisture content of between 1.20°–1.50% by weight.

8. The process of claim 1 and further comprising the step of re-constituting the powdered ice cream by mixing the powder with water.

9. The process of claim 1 wherein the powdered ice cream product comprises approximately 35–38% fat, 37–41% sugar, 20–24% non-fat milk solids, 1–2% moisture and 0.5–1.5% stabilizer and emulsifier.

10. The process of claim 1 and further comprising adding water to the step of mixing cream, non-fat milk solids, sugar and stabilizer.

11. A powdered ice cream product produced by the process of claim 1.

12. A process for the preparation of a powdered ice cream product having a high fat and high sugar content comprising the steps of:
   mixing 8–18% butterfat, 6–15% non-fat milk solids, 12–20% sugar and 0.3–1% stabilizer and emulsifier with water to form a liquid homogenous mixture;
   pasteurizing the mixture;
   homogenizing the mixture;
   cooling the mixture to approximately 40°–42° F. for 3–4 hours to allow the stabilizer to fully activate;
   heating the mixture to approximately 158°–162° F.; and
   atomizing the mixture in a drying chamber having a box dryer having an air inlet temperature of approximately 274°–280° F. and an outlet temperature of approximately 174°–180° F., whereby a powdered ice cream product having a moisture content of between 1.20–1.50% by weight is formed.

13. The process of claim 12 and further comprising the step of adding a flavoring to the mixture after the step of pasteurizing and homogenizing.

14. The process of claim 12 wherein the atomizing of the mixture occurs at between 2400 psi and 3000 psi.

15. The process of claim 12 and further comprising the step of re-constituting the powdered ice cream by mixing the powder with water.

16. The process of claim 12 wherein the powdered ice cream product comprises approximately 35-38% fat, 37-41% sugar, 20-24% non-fat milk solids and 0.5-1.5% stabilizer and emulsifier.

17. A powdered ice cream product produced by the process of claim 12.

* * * * *